(12) United States Patent
Shiomi (10) Patent No.: US 11,404,964 B2
(45) Date of Patent: Aug. 2, 2022

(54) RECTIFIER CIRCUIT AND POWER SUPPLY UNIT

(71) Applicant: SHARP KABUSHIKI KAISHA, Sakai (JP)

(72) Inventor: Takeshi Shiomi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/935,101

(22) Filed: Jul. 21, 2020

(65) Prior Publication Data

US 2021/0028706 A1 Jan. 28, 2021

(30) Foreign Application Priority Data

Jul. 25, 2019 (JP) .............................. JP2019-137156

(51) Int. Cl.
*H02M 3/158* (2006.01)
*H02M 1/00* (2006.01)

(52) U.S. Cl.
CPC ........ *H02M 3/1588* (2013.01); *H02M 1/0051* (2021.05); *H02M 1/0054* (2021.05)

(58) Field of Classification Search
CPC ............. H02M 3/1588; H02M 1/0054; H02M 1/0051; H02M 1/344; H02M 3/158; H02M 1/32
See application file for complete search history.

(56) References Cited

U.S. PATENT DOCUMENTS

| 5,736,842 | A | 4/1998 | Jovanovic | |
|---|---|---|---|---|
| 7,778,054 | B2 * | 8/2010 | Sasaya | H03K 17/08142 363/56.01 |
| 8,890,496 | B2 * | 11/2014 | Inoue | H02M 3/158 323/271 |
| 8,994,349 | B2 * | 3/2015 | Martinelli | H02M 3/1582 323/282 |
| 9,935,551 | B2 * | 4/2018 | Kataoka | H03K 17/08 |
| 10,622,881 | B2 * | 4/2020 | Cyr | H02M 1/088 |
| 11,223,281 | B2 * | 1/2022 | Shiomi | H02M 3/1588 |
| 2006/0164051 | A1 * | 7/2006 | Durbaum | H02M 3/1588 323/282 |
| 2007/0230228 | A1 * | 10/2007 | Mao | H02M 3/33592 363/89 |
| 2010/0061122 | A1 | 3/2010 | Okubo et al. | |
| 2015/0028841 | A1 * | 1/2015 | Cesnak | H02M 3/158 323/311 |
| 2018/0183318 | A1 | 6/2018 | Uenaka et al. | |
| 2020/0266711 | A1 * | 8/2020 | Shiomi | H02M 3/1588 |
| 2020/0266726 | A1 * | 8/2020 | Shiomi | H02M 7/217 |
| 2021/0099081 | A1 * | 4/2021 | Shiomi | H02M 1/34 |

FOREIGN PATENT DOCUMENTS

| JP | 2011-036075 A | 2/2011 |
|---|---|---|
| JP | 2013-198298 A | 9/2013 |

OTHER PUBLICATIONS

Non-Final Rejection of U.S. Appl. No. 16/935,099 dated May 13, 2022.

* cited by examiner

*Primary Examiner* — Kyle J Moody
(74) *Attorney, Agent, or Firm* — ScienBiziP, P.C.

(57) ABSTRACT

A transient current in a rectifier circuit is effectively reduced. In the rectifier circuit, a current flows from a power supply to a coil when a transistor is turned ON. When the transistor is turned OFF, the current of the coil flows into a second rectifier.

10 Claims, 5 Drawing Sheets

RECTIFIER CIRCUIT AND POWER SUPPLY UNIT

CROSS-REFERENCE TO RELATED APPLICATION

The present application claims priority to Japanese Patent Application No. 2019-137156, filed Jul. 25, 2019, the content to which is hereby incorporated by reference into this application.

BACKGROUND OF THE INVENTION

1. Field of the Invention

The following disclosure relates to rectifier circuits.

2. Description of the Background Art

It is known that a rectifier used in a power supply circuit generates a transient current. This transient current is generated when a reverse voltage is applied to the rectifier. Various solutions have been studied because the transient current causes loss.

Japanese Unexamined Patent Application Publication Nos. 2011-36075 and 2013-198298 disclose a circuit one of the purposes of which is to reduce a transient current. The circuit disclosed in Japanese Unexamined Patent Application Publication No. 2011-36075, as an example, includes a diode and a transformer that are connected in parallel with a rectifier to reduce a transient current. Japanese Unexamined Patent Application Publication No. 2013-198298 also discloses a similar circuit to that disclosed in Japanese Unexamined Patent Application Publication No. 2011-36075.

There is still room for improvement in the technique of reducing transient current in a rectifier circuit as will be described later in detail. The present disclosure, in an aspect thereof, has an object to effectively reduce transient current in a rectifier circuit.

SUMMARY OF THE INVENTION

In order to overcome the above problem, a rectifier circuit according to an aspect of the present disclosure causes a rectification current to flow from a second terminal to a first terminal. The rectifier circuit includes: a third terminal between the first terminal and the second terminal, a first rectifier connected to the first terminal and the second terminal, a coil connected to the first terminal and the third terminal; a second rectifier connected to the third terminal and the second terminal; a transistor having a source or an emitter connected to the third terminal; and a power supply having a negative electrode connected to the first terminal and a positive electrode connected to a drain or a collector of the transistor.

The present disclosure, in an aspect thereof, provides a rectifier circuit that can effectively reduce transient current.

DETAILED DESCRIPTION OF THE INVENTION

Embodiment 1

The following will describe a rectifier circuit 1 and a power supply circuit 10 in accordance with Embodiment 1. For convenience of description, members of Embodiment 2 and any subsequent embodiments that have the same function as members described in Embodiment 1 will be indicated by the same reference numerals, and the description thereof shall be omitted.

Purpose of Rectifier Circuit 1

As described earlier, a transient current occurs when a reverse voltage is applied to a rectifier. The transient current occurring in the rectifier having a PN junction is also referred to as a reverse recovery current.

Meanwhile, the transient current also occurs in a rectifier without a PN junction. In such a rectifier, a charge current for a parasitic capacitance under a reverse voltage flows as a transient current. SiC-Schottky barrier diodes (SBDs) or GaN-high electron mobility transistors (HEMTs) are examples of semiconductor devices with no PN junctions.

The rectifier circuit 1 is created for the purpose of reducing these transient currents.

Definition of Terms

Various terms used in the present specification are defined in the following prior to a description of the rectifier circuit 1.

A forward voltage is a voltage generating a forward current in a rectifier.

Consider, as a first example, a situation where the rectifier is a diode. A forward voltage in such a situation is a voltage applied to generate a forward current in the diode.

Consider, as a second example, a situation where the rectifier is a transistor. A forward voltage in such a situation is a voltage at which a rectification current flows with the gate turned OFF and a positive voltage applied to the source with reference to the drain.

These two examples are equivalent to applying, to a second terminal ST1 (detailed later) of the rectifier circuit 1, a positive voltage with reference to a first terminal FT1 (detailed later) of the rectifier circuit 1. The magnitude of the forward voltage varies depending on the device type and is, for example, from 0.1 V to 5 V. The magnitude of the forward current generated under a forward voltage varies depending on the current in a coil and other like inductive device and is, for example, from 0.1 A to 100 A.

A rectification current is a forward current in a rectifier or a rectifier circuit.

A reverse voltage is a voltage applied to a rectifier or a rectifier circuit so that the rectifier or the rectifier circuit does not conduct in the forward direction.

Consider, as a first example, a situation where the rectifier is a diode. A reverse voltage in such a situation is a voltage applied so that no forward current can flow in the diode.

Consider, as a second example, a situation where the rectifier is a transistor. A reverse voltage in such a situation is a positive voltage, with reference to the source, applied to the drain with the gate turned OFF.

These two examples are equivalent to applying, to FT1 of the rectifier circuit 1, a positive voltage with reference to ST1 of the rectifier circuit 1. The magnitude of the reverse voltage varies depending on circuit specifications and is, for example, from 1 V to 1,200 V.

A transient current is a collective term for a reverse recovery current and a charge current for parasitic capacitance of a rectifier. In other words, a transient current is an instantaneous current generated when a reverse voltage is applied to the rectifier. The transient current can be measured at FS1 and SS1 in the example shown in FIG. 1.

A rectification function is a function to cause a monodirectional current flow, but no bidirectional current flow.

Consider, as a first example, a situation where the rectifier is a diode. A rectification function in such a situation is a function of the diode allowing a forward current and blocking a reverse current.

Consider, as a second example, a situation where the rectifier is a transistor. A rectification function in such a situation is a function to allow a current from the source to the drain and block a current from the drain to the source, with the gate turned OFF.

A rectifier is a collective term for devices capable of the rectification function.

A transistor function is a function of a transistor switching ON/OFF a current flow from the drain to the source by turning ON/OFF the gate. Needless to say, the drain needs to be biased positively relative to the source to allow a current flow.

When the device is a bipolar transistor or an insulated gate bipolar transistor (IGBT), the same definitions apply by (i) reading the drain as the collector and (ii) the source as the emitter.

A transistor device is a collective term for devices with the transistor function.

Brief Description of Structure of Power Supply Circuit 10

Figure 1:
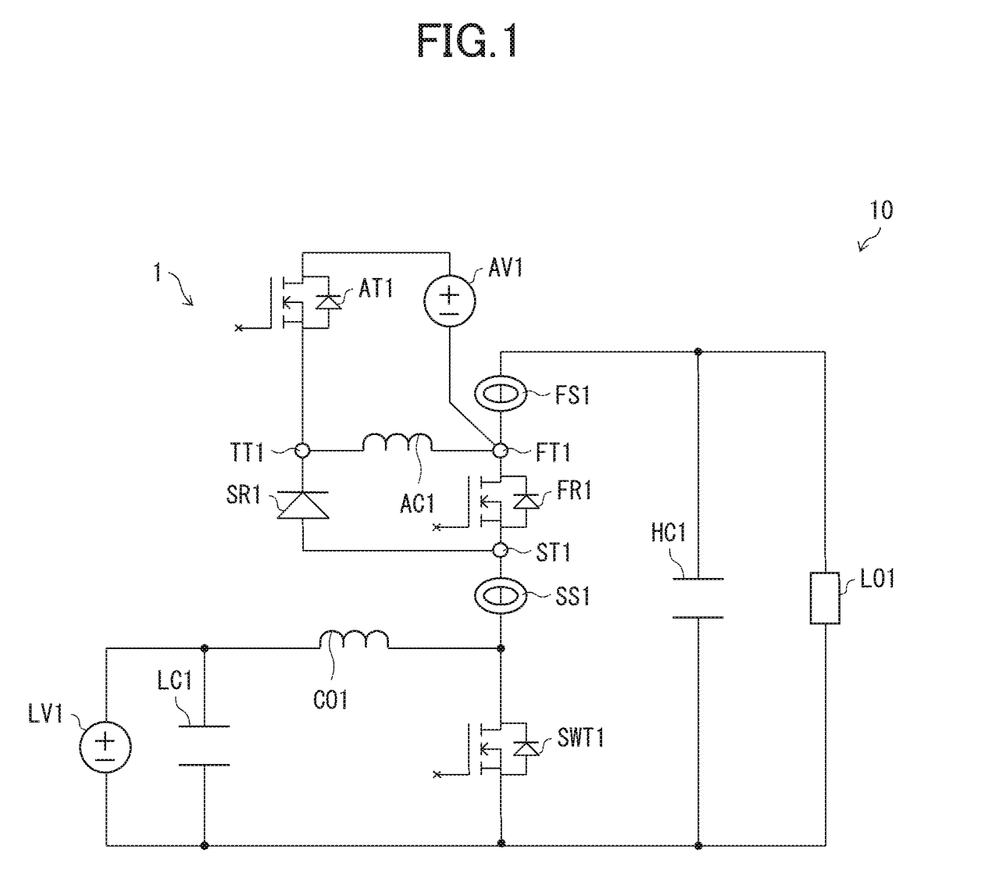
FIG. 1 is a circuit diagram of a power supply circuit in accordance with Embodiment 1.

FIG. 1 is a circuit diagram of the power supply circuit 10 in accordance with Embodiment 1. The power supply circuit 10 is a step-up DC/DC converter that steps up a low voltage to a high voltage. The power supply circuit 10 includes the rectifier circuit 1 in place of a rectifier in a publicly known step-up DC/DC converter. The following description includes numerical values for illustrative purposes only.

Structure of Low-voltage Section of Power Supply Circuit 10

A low-voltage section includes a power supply LV1, a capacitor LC1, and a coil CO1. In the description below, the "power supply LV1" is simply referred to as, for example, "LV1" for the sake of simplicity. The reference signs (+) and (−) of the power supply respectively indicate a positive electrode and a negative electrode. In LV1, the negative electrode has a voltage of 0 V, and the positive electrode has a voltage of 200 V. LC1 has a capacitance of 1 µF. CO1 has an inductance of 500 pH, and an average current of 14 A.

Structure of High-voltage Section of Power Supply Circuit 10

A high-voltage section includes a capacitor HC1 and a load LO1. HC1 has a capacitance of 3.3 mF and a voltage of 400 V. The power supply circuit 10 is designed so that the voltage across HC1 is twice that across LV1.

Structure of Rectifier Circuit 1 of Power Supply Circuit 10

A typical rectifier circuit includes a first rectifier FR1. In contrast, apart from a first rectifier FR1, the rectifier circuit 1 additionally includes a second rectifier SR1, a coil AC1, a transistor AT1, and a power supply AV1.

The first rectifier FR1 is a cascode GaN-HEMT. FR1 has a drain breakdown voltage of 650 V and an ON resistance of 50 ml. The example shown in FIG. 1 uses the same schematic symbol as a metal-oxide semiconductor field-effect transistor (MOSFET) to represent a cascode GaN-HEMT.

The second rectifier SR1 is a SiC-SBD with a breakdown voltage of 650 V. SR1 allows a forward voltage of 0.9 V upon starting to conduct, and a resistance of 50 mf while conducting in the forward direction.

The coil AC1 is a coil with an inductance of 1 pH and a DC resistance of 50 mΩ.

The transistor AT1 is a MOSFET with an ON resistance of 40 mΩ.

The power supply AV1 is a 15-V power supply. AV1 has a negative electrode connected to FT1. In Embodiment 1, FT1 has a voltage of 400 V, such that a positive electrode of AV1 has a voltage of 415 V.

The first terminal FT1 provides an electrical connection between FR1, AC1, and AV1.

The second terminal ST1 provides an electrical connection between FR1 and SR1.

A third terminal TT1 provides an electrical connection between SR1, AC1, and AT1.

Reference signs FS1 and SS1 denote points where a current can be measured in the rectifier circuit 1. FS1 and SS will give equal current measurements. Any current sensor may be used including a hole-element type current sensor, a current transformer (CT) sensor, a Rogowski coil, and a shunt resistance system.

Structure of Transistor Function Section of Power Supply Circuit 10

The transistor function section includes a transistor SWT1. SWT1 is the same in device type as FR1.

Each device in the power supply circuit 10 has a gate terminal connected to a control circuit 9 shown in FIG. 6 (detailed later), so that the gates can be turned ON and OFF by the control circuit 9.

Structure of Circuit as Comparative Example

A power supply circuit 10r (not-shown) is a step-up DC/DC converter as a comparative example. The power supply circuit 10r is the power supply circuit 10 whose rectifier circuit 1 is replaced with FR1 alone. Described first is an operation and a transient current of the power supply circuit 10r. After that, those of the power supply circuit 10 will be described.

Operation 1 of Comparative Example

First, the switch node is at a voltage of approximately 0 V while SWT1 is ON. CO1 is therefore placed under a voltage of approximately 200 V, thereby increasing the coil current. The coil current flows following a path, LV1 (positive electrode)→CO1→SWT1→LV1 (negative electrode).

Operation 2 of Comparative Example

Next, SWT1 is turned OFF. The electromotive force of CO1 consequently places ST1 at a higher voltage than FT1 by approximately 1 V. This voltage of approximately 1 V is applied to FR1 as a forward voltage, generating a rectification current flowing from CO1 to FR1. The rectification current flows following a path, LV1 (positive electrode) →CO1→FR1→LO1→LV1 (negative electrode).

Operation 3 of Comparative Example

Subsequently, SWT1 is turned ON, which changes the voltage at the switch node to approximately 0 V. A reverse voltage of approximately 400 V is therefore applied to FR1, thereby generating a transient current.

This set of operations 1 to 3 is repeatedly performed at a frequency of 100 kHz. SWT1 has a duty ratio of 50%. FR1 is therefore placed alternately under a forward voltage and a reverse voltage every 5 psec.

Figure 2:
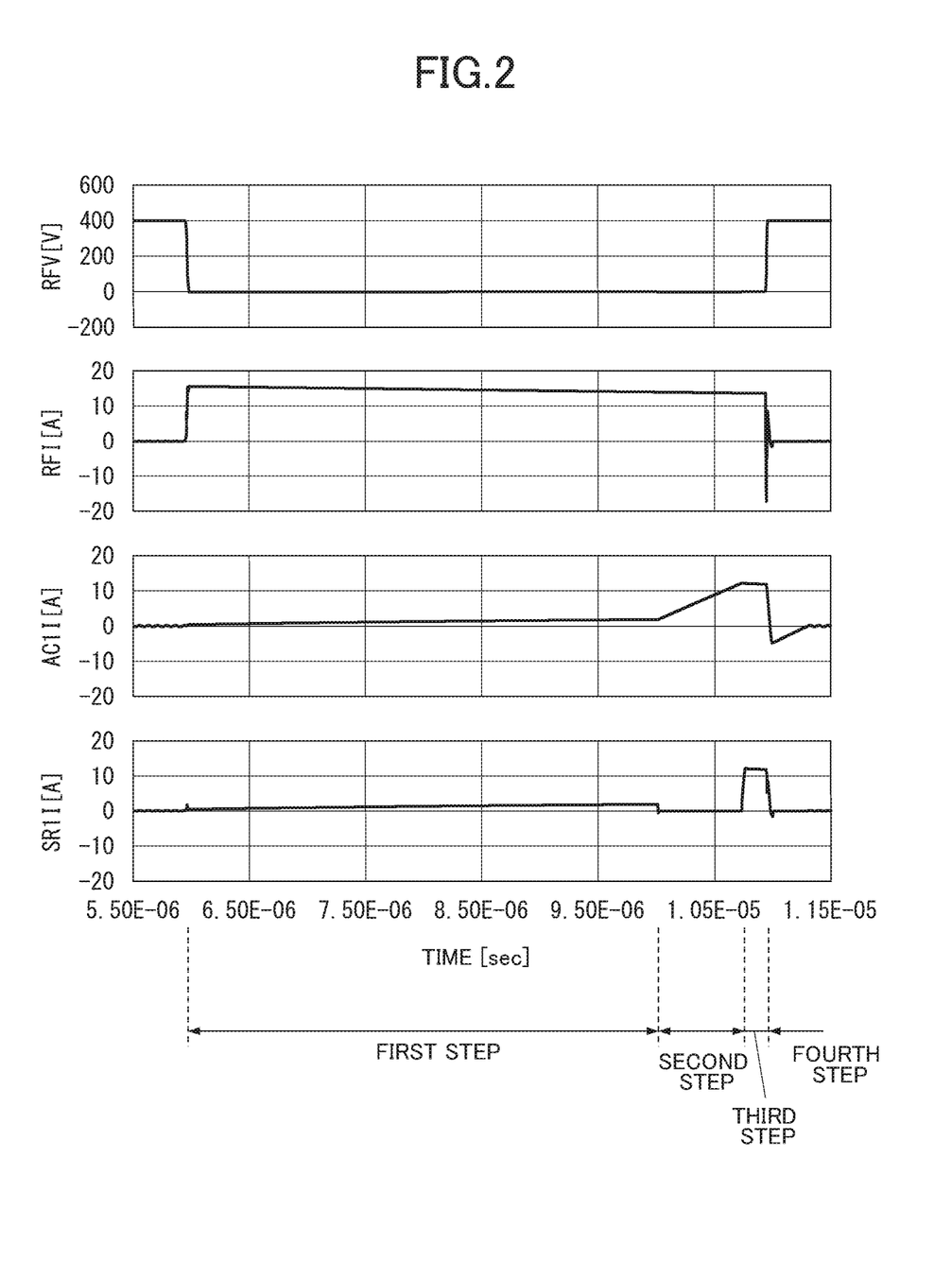
FIG. 2 is a set of diagrams of voltage and current waveforms.
Figure 3:
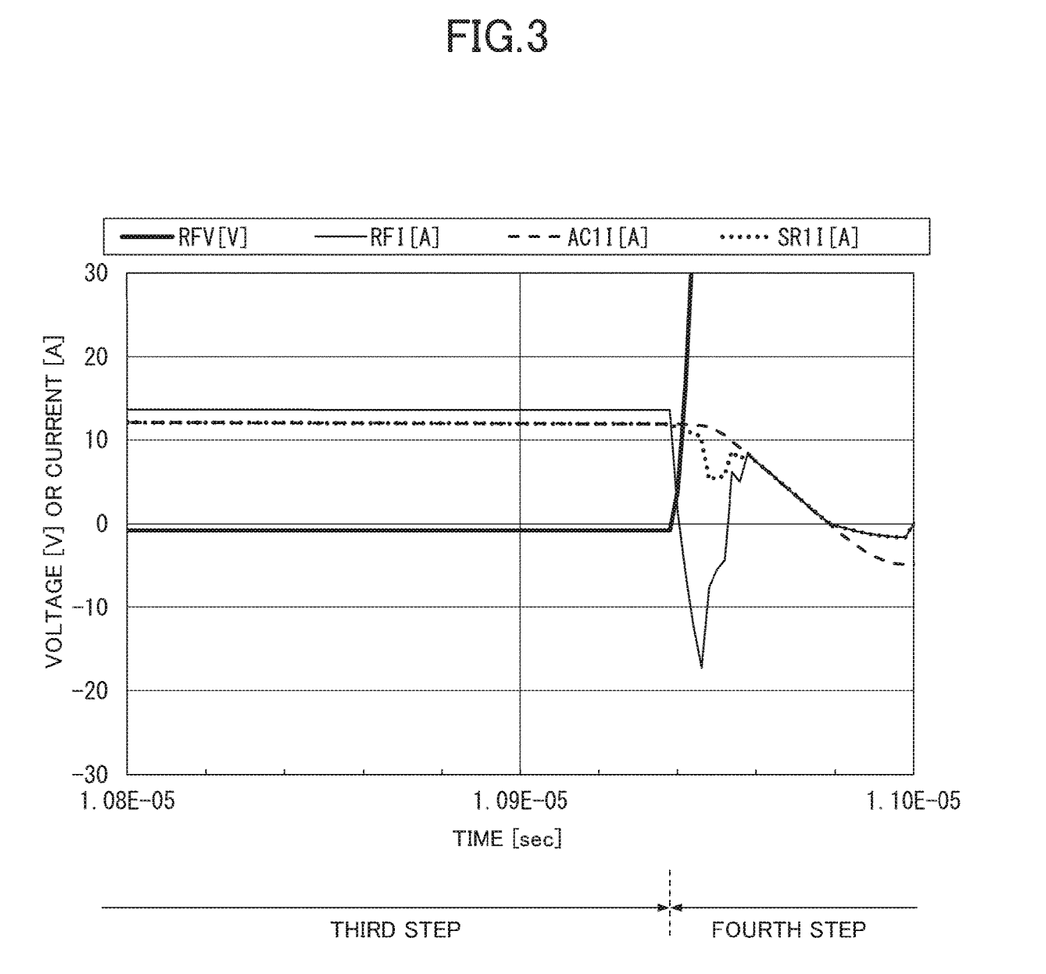
FIG. 3 is a diagram collectively showing the graphs in FIG. 2 on an enlarged scale.
Figure 4:
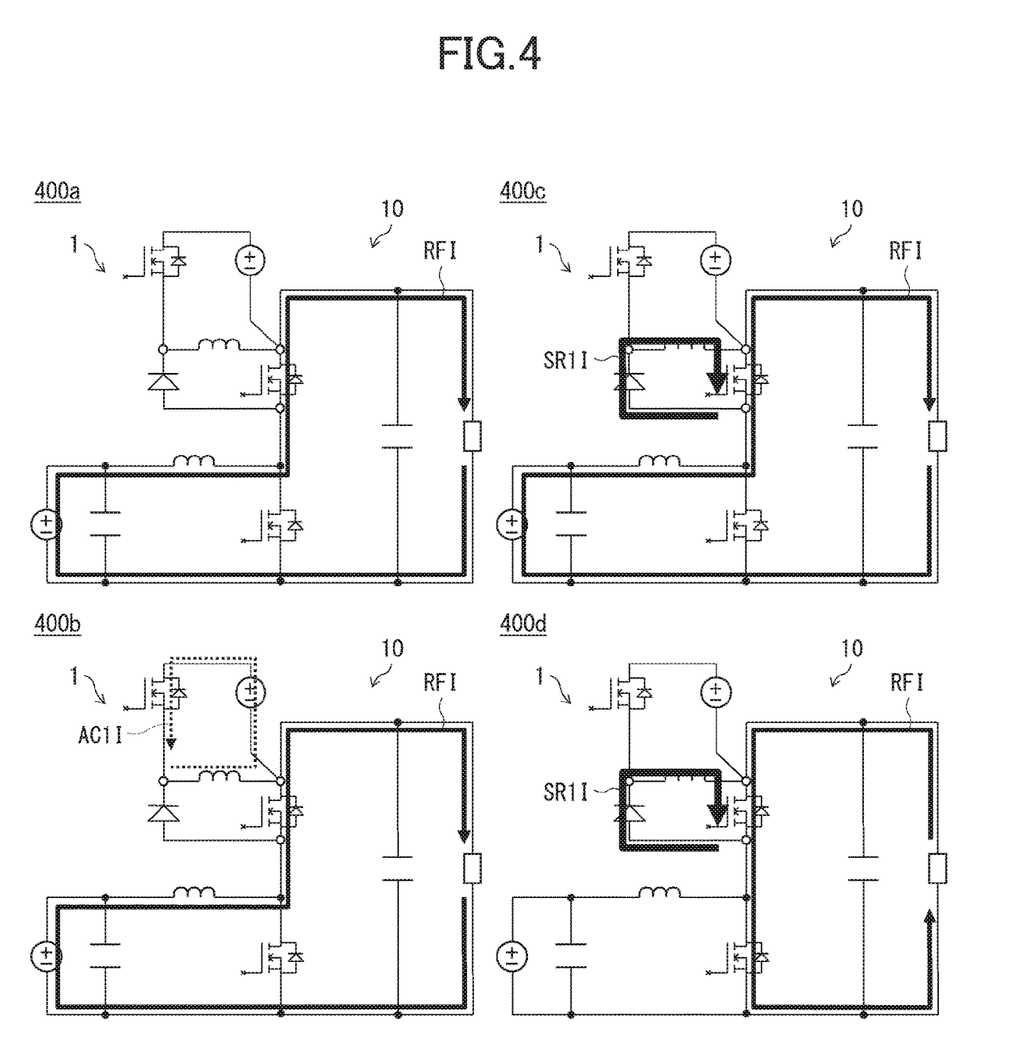
FIG. 4 is a set of diagrams showing current paths in the first to fourth steps.

Description of FIGS. 2 to 4 Illustrating Operations of Rectifier Circuit 1

FIG. 2 is a set of graphs representing four voltage and current waveforms in the rectifier circuit 1. All the waveforms are drawn on a common time axis (horizontal axis). The four waveforms represent:

RFV (voltage across the rectifier circuit 1), which is a voltage applied to FT1 relative to ST1;

RFI (current through the rectifier circuit 1), which is a current flowing from ST1 to FT1;

AC1I (current through AC1), which is a current flowing from TT1 to FT1; and

SR1I (current through SR1), which is a current flowing from ST1 to TT. FIG. 2 shows, on its horizontal axis, timings for first to fourth steps (detailed later).

FIG. 3 is a diagram collectively showing the graphs of the four waveforms in FIG. 2 in a single graph on an enlarged scale. FIG. 3 shows RFV rising beyond the top of the graph for convenience in drawing the waveforms on an enlarged scale.

FIG. 4 is a set of diagrams showing current paths in the first to fourth steps. Specifically, portions 400a to 400d of FIG. 4 represent current paths in the first to fourth steps respectively. FIG. 4 omits some of the reference numerals and symbols shown in FIG. 1 for convenience.

How Rectifier Circuit 1 is Driven: First to Fourth Steps

According to a method of driving the rectifier circuit 1, the following four steps are performed in this sequence:

A first step of applying a forward voltage across the rectifier circuit 1 to generate a rectification current;

A second step of turning ON AT1 to generate a current flowing through AC1;

A third step of turning OFF AT1 to generate a current flowing through SR1;

A fourth step of applying a reverse voltage across the rectifier circuit 1 to stop the rectification current.

First Step: Generating Rectification Current Flowing Through Rectifier Circuit 1

Prior to the first step, a current is flowing from CO1 to SWT1. SWT1 is accordingly turned OFF in the first step, thereby generating in CO1 an electromotive force. The electromotive force in turn leads to the application of a forward voltage of approximately 1 V across the rectifier circuit 1. As a result, a rectification current is generated to flow through FR1. The rectification current flows following the path shown by RFI in 400a of FIG. 4.

The current through SR1 is smaller than the current through FR1 in the first step. SR1I, which is shown in 400c to 400d of FIG. 4, is omitted in 400a of FIG. 4 for this reason.

Second Step: Generating Current Flowing through AC1

Subsequent to the first step, AT1 is turned ON, thereby generating AC1I to flow. AC1I flows following the path shown in 400b of FIG. 4. AC1I increases more or less linearly with time. The coil accumulates energy in this second step.

Third Step: Generating Current Flowing through SR1

Subsequent to the second step, AT1 is turned OFF, thereby generating SR1I to flow. SR1I flows following the path shown in 400c of FIG. 4. In other words, the energy accumulated in the coil transforms into SR1I.

The path followed by SR1I may be described from a different point of view. A description will be given particularly of the current through FR1 in 400c of FIG. 4. FIG. 4 shows in 400c both RFI and SR1I for FR1. RFI denotes a current flowing upward in FR1, whereas SR1I denotes a current flowing downward in FR1. These currents, flowing in opposite directions through FR1, cancel each other at least to some extent. In Embodiment 1, SR1I is set smaller than RFI. This setting is to decrease unnecessary SR1I to reduce loss by the current.

Fourth Step: Applying Reverse Voltage Across Rectifier Circuit 1

In the fourth step, SWT1 is turned ON, thereby applying a reverse voltage of 400 V across the rectifier circuit 1. The reverse voltage may be applied by one of various methods available in accordance with the type of the power supply circuit.

A transient current (RFI in the reverse direction) flows simultaneously with the application of the reverse voltage, charging the parasitic capacitance of FR1. The transient current flows following the path denoted by RFI in 400d of FIG. 4. There is another current (not shown in 400d of FIG. 4) that flows following a path, LV1 (positive electrode) →CO1→SWT1→LV1 (negative electrode), since the start of the fourth step.

Theoretical Basis for Transient Current Reduction by FR1I

In the rectifier circuit 1, the reverse voltage is applied, generating a transient current, while SR1I is flowing following such a path as to charge the parasitic capacitance of FR1.

In other words, the parasitic capacitance of FR1 can be charged with SR1I and RFI. The transient current hence decreases by as much as SR1I. Accordingly, the transient current can be effectively reduced over conventional techniques.

Comparison between Transient Currents and Verification of Effects of Reduction

A comparison in transient current is made between the power supply circuit 10r in the comparative example and the power supply circuit 10 to verify effects of the reduction in the transient current in the rectifier circuit 1.

Transient Current in Comparative Example

Figure 5:
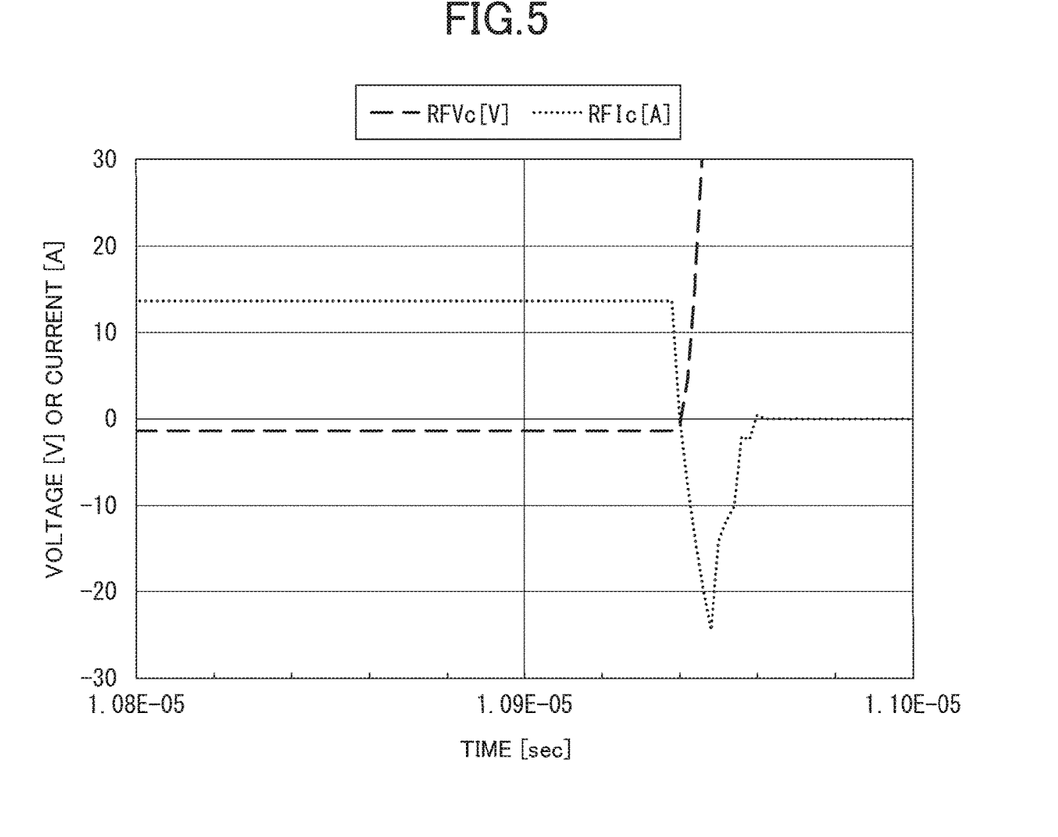
FIG. 5 is a diagram of voltage and current waveforms in a power supply circuit in accordance with a comparative example.

FIG. 5 is a graph representing the waveforms of a rectifier circuit voltage (RFVc) and a rectifier circuit current (RFIc) in the power supply circuit 10r in the comparative example. The horizontal and vertical axes of the graph in FIG. 5 have the same scale as those in the graph in FIG. 3.

FIG. 5 shows that, in the comparative example, RFIc of −25 A; namely, a transient current, flows. The reverse voltage (RFVc) is 400 V, which is the same as that in the example in FIG. 3.

Transient Current in Rectifier Circuit 1

Described here with reference to FIG. 3 is a transient current in the rectifier circuit 1 of the power supply circuit 10. In the example of FIG. 3, the transient current (negative RFI) is 18 A. As can be seen in the verification, the rectifier circuit 1 can reduce the transient current compared with the comparative example.

Features 1 to 3 for Effective Operation of Rectifier Circuit 1

Embodiment 1 adopts preferable features. These preferable features are described below.

Feature 1: Generating SR1I to Flow while Rectifying Current is Flowing Through Rectifier Circuit 1

As described above, SR1I is used to reduce a transient current. Hence, it is important to reduce the fall of SR1I during a time period until the transient current flows. In Embodiment 1, SR1I flows while a rectifying current is flowing through the rectifier circuit 1. When a current flows through the rectifier circuit 1, a voltage at FT1 with respect to ST drops by a voltage drop of FR1. Meanwhile, SR1I flows from ST1 toward FT1 through SR1 and AC1. Specifically, the current flows from ST1 having a high voltage to FT1 having a low voltage. Such a feature makes it possible to reduce the fall of SR1I.

Feature 2: Securing Magnetic Energy by Voltage Drop of FR1

As described above, SR1I is used to reduce a transient current. Hence, an efficient increase in SR1I contributes to further reduction in the transient current. Embodiment 1 presents an improvement in an efficient flow of SR1I in large amount.

Specifically, in Embodiment 1, FR1 has a voltage drop greater than a voltage trop of SR1 when SR1 starts conducting SR1I. Here, the voltage drop of FR1 is caused by a flow of a current from ST1 to FT1.

Such a feature allows a current to flow into AC1 through SR1 while the current is flowing in FR1. This current is represented by AC1I in FIG. 2. In an example of FIG. 2, approximately 2 A of FR1I flows at a time "1.00E-5 sec." Hence, FIG. 2 shows that, in the second step, AC1I increases from an initial value of not 0 A but approximately 2 A. Such a feature makes it possible to secure FR1I larger by approximately 2 A.

Feature 3: Voltage of AV1 is Lower than Reverse Voltage

The voltage of AV1 is preferably low because AT1 causes switching loss. No reverse voltage (400 V) is used in Embodiment 1. Instead, AV1 is used which is a voltage source for a lower voltage. This arrangement can reduce switching loss caused by AT1.

Meanwhile, the voltage of AV1 preferably has such a value (at least 5 V) that a transistor (e.g., AT1) can operate in its saturation region, in order to reduce conductance loss in AT1.

AV1 is higher than or equal to 5 V and is lower than the reverse voltage in Embodiment 1.

Variation Examples: Variations of Devices

In Embodiment 1, FR1 is a cascode GaN-HEMT, and SR1 is a SiC-SBD. These devices are not limited in any particular manner so long as they fall in one of the above-described device types. Likewise, SWT1 is not limited to any particular type so long as it has a transistor function. The rectifier can have its conductance loss reduced by employing commonly used synchronized rectification.

Embodiment 2

The rectifier circuit in accordance with an aspect of the present disclosure is applicable to power supply circuits provided with a rectifier circuit. Examples of such a power supply circuit include a chopper circuit, an inverter circuit, and a power factor correction (PFC) circuit.

Figure 6:
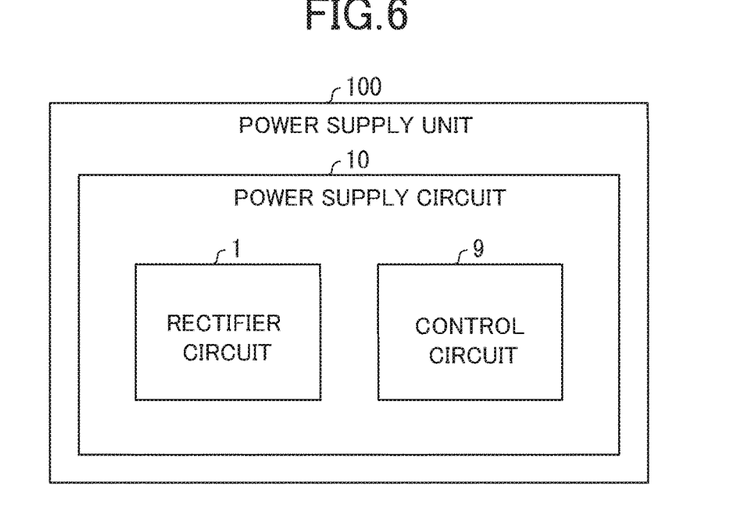
FIG. 6 is a diagram of a power supply unit in accordance with Embodiment 2.

FIG. 6 is a diagram of a power supply unit 100 including a power supply circuit 10. The rectifier circuit 1 is capable of reducing loss in the power supply circuit 10 and the power supply unit 100. The power supply circuit 10 further includes a control circuit 9. The control circuit 9 controls the turning-ON/OFF of each device in the power supply circuit 10. The control circuit 9 in particular includes a built-in gate-driving power supply (voltage: 15 V) for turning-ON/OFF of AT1. The first to fourth steps may be performed by the control circuit 9 controlling the turning-ON/OFF of each device in the power supply circuit 10.

SUMMARY

A rectifier circuit according to an aspect of the present disclosure causes a rectification current to flow from a second terminal to a first terminal. The rectifier circuit includes: a third terminal between the first terminal and the second terminal; a first rectifier connected to the first terminal and the second terminal; a coil connected to the first terminal and the third terminal; a second rectifier connected to the third terminal and the second terminal; a transistor having a source or an emitter connected to the third terminal; and a power supply having a negative electrode connected to the first terminal and a positive electrode connected to a drain or a collector of the transistor.

As can be seen, the transient current causes loss in a circuit. Hence, the inventors of the present application have conceived an idea that "the first reverse voltage caused by the current of the coil contributes to reduction in transient current", and found out the above structure.

Thanks to the above structure, the transistor is turned ON, so that the current flows in the coil and the coil accumulates energy. Then, the transistor is turned OFF, so that the energy is converted into a current of the second rectifier (a second rectifier current), thereby reducing the transient current.

This is because the second rectifier current causes a current component as the transient current to flow through a path including the coil, the second rectifier, and the first rectifier.

In the rectifier circuit according to claim 1, a reverse voltage may be applied to the rectifier circuit while the rectification current is flowing in the second rectifier.

The above structure enables reduction of the current component as the transient current, using the second rectifier current flowing in the period.

In rectifier circuit according to a third aspect of the present disclosure, the second rectifier may start conducting the rectification current while the rectification current is flowing in the first rectifier.

Thanks to the above structure, the rectifier current drops a voltage of the first rectifier. In other words, the voltage of the second terminal rises above that of the first terminal. Such a feature allows the second rectifier current to easily flow from the second terminal to the first terminal, making it possible to let the second rectifier current flow continuously.

In the rectifier circuit according to a fourth aspect of the present disclosure, the first rectifier may have a voltage drop greater than a voltage drop of the second rectifier when the second rectifier start conducting the rectification current. Here, the voltage drop of the first rectifier is caused by a flow of the rectification current in the first rectifier.

The above structure enables the current to flow in the coil through the second rectifier while the current is flowing in the first rectifier. Such a feature allows the coil to accumulate energy.

In the rectifier circuit according to a fifth aspect of the present disclosure, the power supply may supply a voltage lower than the reverse voltage.

This structure enables switching of the transistor using a low voltage, thereby reducing switching loss in the transistor.

A power supply unit according to a sixth aspect of the present disclosure includes the rectifier circuit according to an aspect of the present disclosure.

According to this structure, the use of the rectifier circuit in which transient current is reduced realizes a power supply unit in which loss is reduced.

ADDITIONAL REMARKS

The present disclosure, in an aspect thereof, is not limited to the description of the embodiments above and may be altered within the scope of the claims. Embodiments based on a proper combination of technical means disclosed in different embodiments are encompassed in the technical scope of the aspect of the present disclosure. Furthermore, a new technological feature can be created by combining different technological means disclosed in the embodiments.

What is claimed is:

1. A rectifier circuit comprising:
    a first rectifier having first and second electrodes, the second electrode being a source or an anode, and the first electrode being a drain or a cathode;
    a second rectifier having an anode and a cathode, the anode connected to the second electrode of the first rectifier;
    a coil having first and second ends, the first end being connected to the cathode of the second rectifier, and the second end being connected to the first electrode of the first rectifier;
    a transistor having a source or an emitter connected to both of first end of the coil and the cathode of the second rectifier; and
    a power supply having negative and positive electrodes, the negative electrode being connected to both the first electrode of the first rectifier and second end of the coil, the positive electrode being connected to a drain or a collector of the transistor, and the power supply supplying a predetermined direct current voltage.

2. The rectifier circuit according to claim 1, wherein while a rectification current is flowing in the second rectifier, a reverse voltage is applied to the rectifier circuit.

3. The rectifier circuit according to claim 2, wherein while the rectification current is flowing in the first rectifier, the second rectifier starts conducting the rectification current.

4. The rectifier circuit according to claim 3, wherein:
    the first rectifier has a voltage drop greater than a voltage drop of the second rectifier when the second rectifier starts conducting the rectification current, and
    the voltage drop of the first rectifier is caused by a flow of the rectification current in the first rectifier.

5. The rectifier circuit according to claim 2, wherein:
    the first rectifier has a voltage drop greater than a voltage drop of the second rectifier when the second rectifier starts conducting the rectification current, and
    the voltage drop of the first rectifier is caused by a flow of the rectification current in the first rectifier.

6. The rectifier circuit according to claim 2, wherein the power supply supplies a voltage lower than the reverse voltage.

7. The rectifier circuit according to claim 1, wherein while a rectification current is flowing in the first rectifier, the second rectifier starts conducting the rectification current.

8. The rectifier circuit according to claim 7, wherein:
    the first rectifier has a voltage drop greater than a voltage drop of the second rectifier when the second rectifier starts conducting the rectification current, and
    the voltage drop of the first rectifier is caused by a flow of the rectification current in the first rectifier.

9. The rectifier circuit according to claim 1, wherein:
    the first rectifier has a voltage drop greater than a voltage drop of the second rectifier when the second rectifier starts conducting the rectification current, and
    the voltage drop of the first rectifier is caused by a flow of the rectification current in the first rectifier.

10. A power supply unit comprising the rectifier circuit according to claim 1.

* * * * *